United States Patent
Kettleborough

(10) Patent No.: US 10,301,792 B2
(45) Date of Patent: May 28, 2019

(54) HYDRAULIC DAMPENER FOR USE ON MINE SHOVELS

(71) Applicant: MICROMATIC LLC, Berne, IN (US)

(72) Inventor: Andrew Kettleborough, Fort Wayne, IN (US)

(73) Assignee: MICROMATIC LLC, Berne, IN (US)

( * ) Notice: Subject to any disclaimer, the term of this patent is extended or adjusted under 35 U.S.C. 154(b) by 1058 days.

(21) Appl. No.: 14/701,108

(22) Filed: Apr. 30, 2015

(65) Prior Publication Data

US 2016/0319847 A1    Nov. 3, 2016

(51) Int. Cl.
*E02F 9/22* (2006.01)
*F16F 9/14* (2006.01)
*E02F 3/407* (2006.01)

(52) U.S. Cl.
CPC .......... *E02F 3/4075* (2013.01); *E02F 9/2217* (2013.01); *F16F 9/145* (2013.01)

(58) Field of Classification Search
CPC ... F16F 9/12; F16F 9/145; F16F 9/516; F16D 57/02; F16K 17/18; B62K 71/08; B60G 2202/22; E02F 9/2217; F15B 1/021; F15B 2201/20; E05Y 2201/21
USPC ............... 188/290, 306; 91/5, 471; 92/121; 414/726
See application file for complete search history.

(56) References Cited

U.S. PATENT DOCUMENTS

| | | | |
|---|---|---|---|
| 4,006,832 A | 2/1977 | Auxer et al. | |
| 4,773,514 A * | 9/1988 | Gustafsson | B62K 21/08 188/306 |
| 5,735,067 A | 4/1998 | Isley et al. | |
| 5,815,960 A | 10/1998 | Soczka | |
| 5,974,705 A | 11/1999 | Isley et al. | |
| 5,988,329 A | 11/1999 | Evans, Jr. et al. | |
| 6,219,946 B1 | 4/2001 | Soczka | |
| 8,732,994 B2 | 5/2014 | Dube et al. | |
| 8,943,715 B2 | 2/2015 | Gross et al. | |
| 8,959,805 B2 | 2/2015 | Bienfang et al. | |
| 9,045,883 B2 | 6/2015 | Schob et al. | |
| 9,180,558 B2 | 11/2015 | Bienfang et al. | |
| 9,206,587 B2 | 12/2015 | Linstroth et al. | |
| 2002/0040540 A1 | 4/2002 | Brown | |
| 2003/0234508 A1* | 12/2003 | Hanawa | B62K 21/08 280/272 |
| 2004/0200680 A1* | 10/2004 | Yamada | B62K 21/08 188/293 |
| 2004/0211632 A1* | 10/2004 | Yamada | B62K 21/08 188/290 |
| 2006/0180416 A1* | 8/2006 | Mishima | B62K 21/08 188/290 |

(Continued)

*Primary Examiner* — Robert A. Siconolfi
*Assistant Examiner* — San M Aung
(74) *Attorney, Agent, or Firm* — Woodling, Krost and Rust

(57) ABSTRACT

A dampener includes an external reservoir which stores hydraulic fluid due to fluid expansion caused by heat generated by fluid flow through valves that cause a drop in fluid pressure. The primary manifold controls hydraulic fluid flow within the dampener. A diverter valve communicates with the passageways between the dampener and the external reservoir. Hydraulic flow is bi-directional between the primary manifold and the accumulator. Hydraulic fluid flow is restricted when flowing from the primary manifold to the accumulator but is unrestricted when flowing from the accumulator back to the primary manifold and dampener.

15 Claims, 16 Drawing Sheets

(56) References Cited

U.S. PATENT DOCUMENTS

| | | | |
|---|---|---|---|
| 2006/0220340 A1* | 10/2006 | Seki | B62K 21/08 |
| | | | 280/272 |
| 2007/0214688 A1 | 9/2007 | Wallet | |
| 2011/0239494 A1 | 6/2011 | Dube et al. | |
| 2012/0260538 A1 | 10/2012 | Schob et al. | |
| 2013/0000160 A1 | 1/2013 | Kobayashi et al. | |
| 2013/0192099 A1 | 8/2013 | Gilmore et al. | |
| 2013/0192100 A1 | 8/2013 | Gilmore et al. | |
| 2013/0192101 A1 | 8/2013 | Gilmore et al. | |
| 2014/0007468 A1 | 1/2014 | Gross et al. | |
| 2014/0007469 A1 | 1/2014 | Gross et al. | |
| 2014/0102841 A1 | 4/2014 | Pilon | |
| 2014/0165431 A1 | 6/2014 | Bienfang et al. | |
| 2014/0165432 A1 | 6/2014 | Briscoe et al. | |
| 2014/0202048 A1 | 7/2014 | Bienfang et al. | |
| 2014/0205414 A1* | 7/2014 | Bienfang | E02F 3/4075 |
| | | | 414/726 |
| 2014/0205415 A1 | 7/2014 | Bienfang et al. | |
| 2015/0089847 A1 | 4/2015 | Gross et al. | |

* cited by examiner

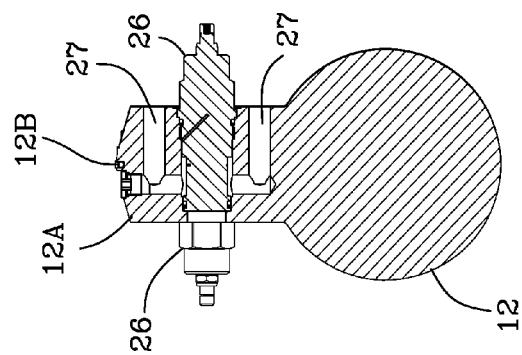
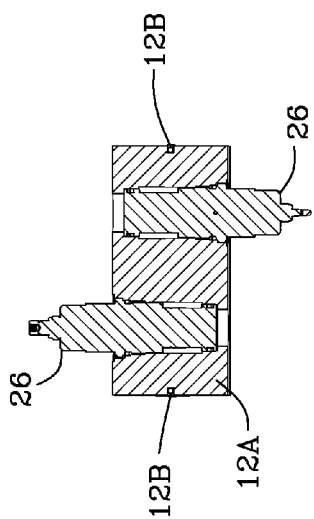
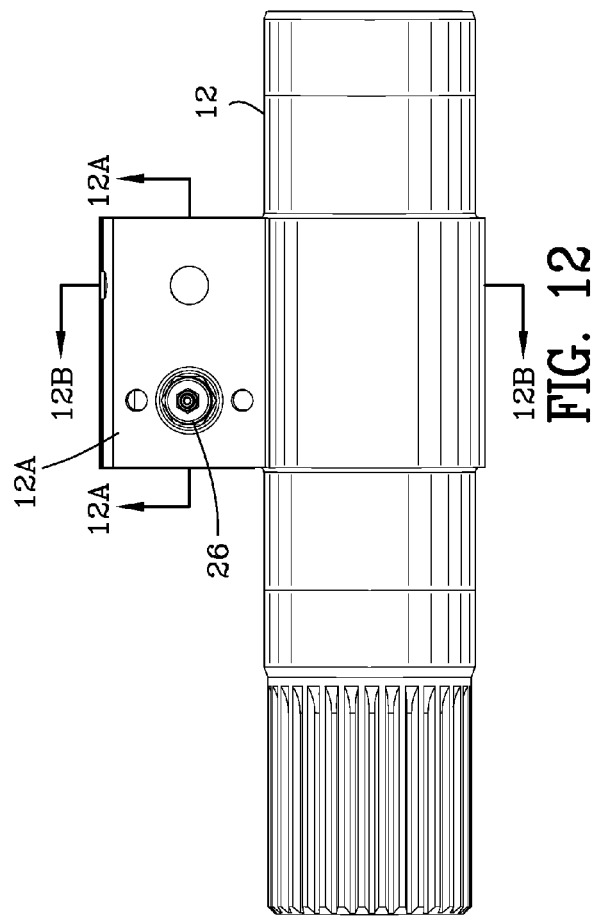

HYDRAULIC DAMPENER FOR USE ON MINE SHOVELS

BACKGROUND

The bucket-ends of shovels used in open pit mine operations are typically composed of a large central body to hold and move material with a rear door for dumping. The doors are typically a hinge-style design and, if not controlled, will swing wildly when opened or closed. The door can contact the main boom when opened and can impact the bucket structure when closed. Repeated door impacts will cause the bucket structure to fatigue and crack. Impact noise is an issue.

To reduce door-induced damage and noise, the industry installs various types of door-rotation inhibiting devices in an effort to reduce the momentum of the door. Of these, the majority are variations of either a friction-disk or a hydraulic design.

Friction-disk designs offer excellent resistance torques in relatively small packaging envelopes when adjusted properly; however, torque quickly reduces as friction plates wear. Maintenance and adjustment is frequent to maintain good performance. The required maintenance cycle is impractical and seldom followed leading to poor overall performance.

For various reasons, hydraulic designs do not match the high-torque versus small-size combination offered by friction disks; however, maintenance on hydraulic units is typically not required once they are operational so the overall performance is better than the previous option. However, hydraulic units have design challenges of their own. Among these are torque adjustability, ease of installation, fluid volumetric changes due to temperature, and internal pressure spikes.

SUMMARY OF THE INVENTION

This invention uses fully self-contained hydraulic rotary actuator assemblies also known as dampeners to impose a counter-torque to dampen the rotation of the door to reduce door impact damage to the bucket structure and reduce noise. Once the dampeners are attached to the bucket structure and the dampener arm is attached to the door linkage, they are ready for service. No additional plumbing or electrical connections are required.

The invention utilizes an external hydraulic manifold and valve design. This provides an opportunity to adjust output torque in the field without exposing sensitive hydraulic pressure seals to contamination and damage. The primary external manifold also houses a flow restriction valve (needle valve) that can be quickly accessed and adjusted in the field. Adjusting this flow restriction valve (needle valve) greatly decreases torque required to rotate the dampener arm which is helpful during installation to align and attach the arm to the door linkage.

The invention uses a unique fluid management design to maintain fluid level within the dampener regardless of fluid temperature. The invention allows the dampeners to be completely filled with oil thereby eliminating air from the system and its potential for cavitation damage. The system uses an external accumulator reservoir to collect excess fluid as it expands due to added heat but can return it to the dampener via accumulator-induced pressure as it is needed.

As an added safety measure, the invention incorporates relief valves inside the dampener that are triggered by abnormal pressure spikes. The additional valves increase the internal flow rate thereby decreasing spike pressure and its damage potential.

BRIEF DESCRIPTION OF THE DRAWINGS

FIG. 12 is a view of the dampener shaft illustrating the shaft vane and valving.

FIG. 12A is a sectional view of the shaft vane taken along the lines 12A-12A in FIG. 12.

FIG. 12B is a sectional view of the shaft vane taken along the lines 12B-12B in FIG. 12.

DESCRIPTION OF THE INVENTION

Figure 3:
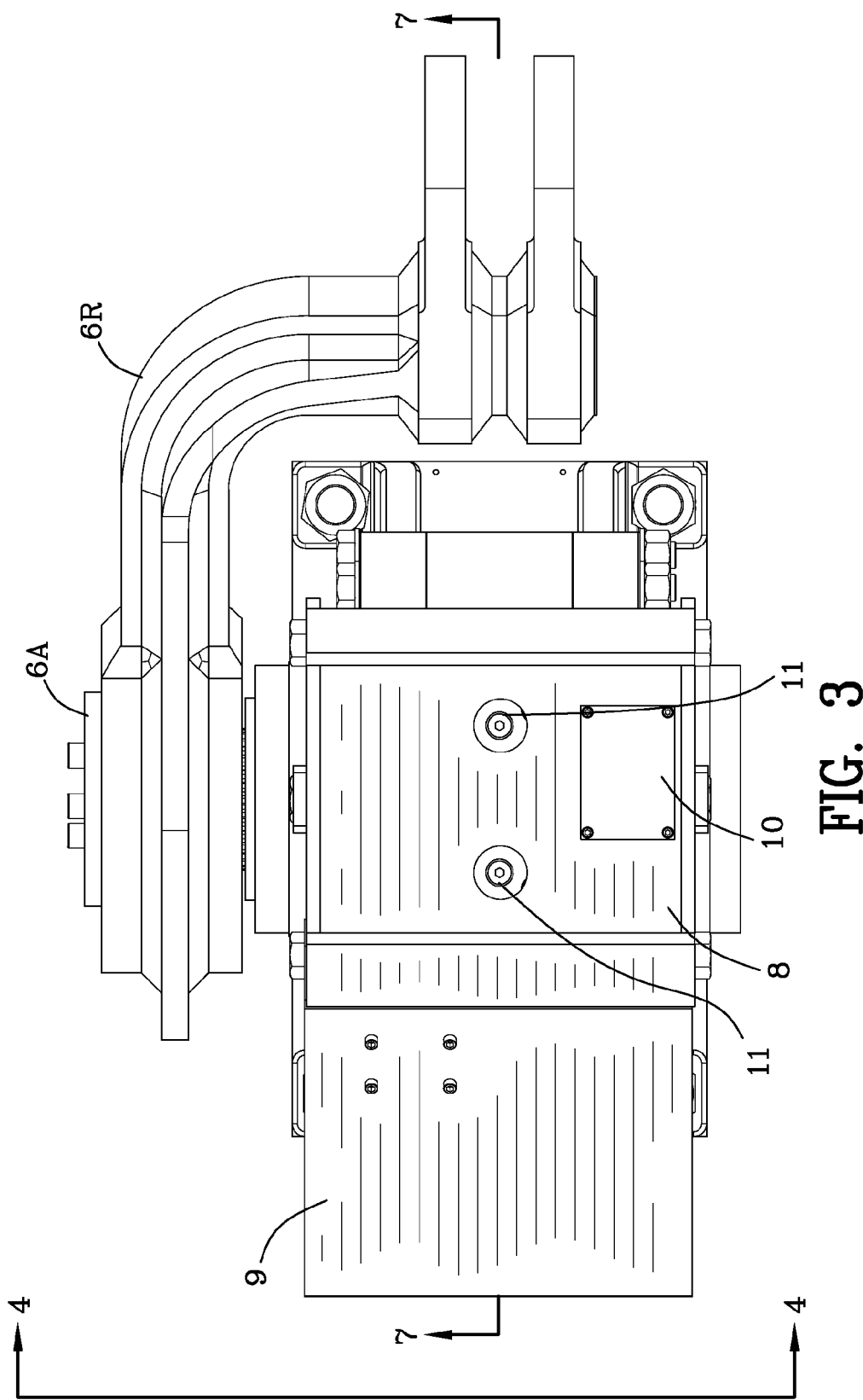
FIG. 3 is a top view of a right hand dampener assembly from the perspective of line 3-3 in FIG. 1.
Figure 7:
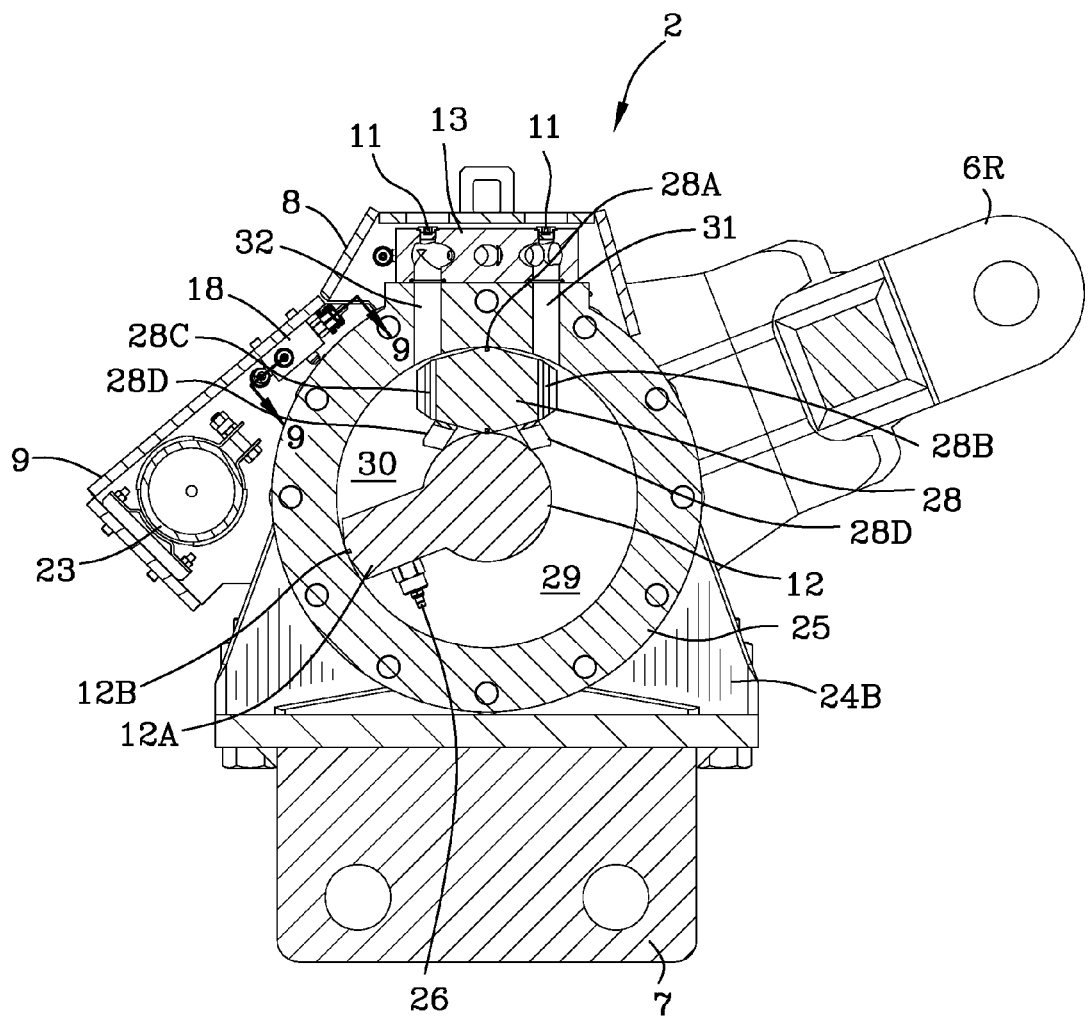
FIG. 7 is a cross-sectional view of the right hand dampener assembly taken along the line 7-7 in FIG. 3.

FIG. 7 is a cross-sectional view of the right hand dampener assembly 2 taken along the line 7-7 in FIG. 3. Referring to FIG. 7, a rotatable actuator arm 6R operates in the closed direction when the arm rotates clockwise and the actuator arm operates in the open direction when the arm rotates in the counter-clockwise direction. The arm is connected by way of linkage to a door which is used on a bucket which excavates earth. As the bucket is filled with earth or minerals, it becomes full and must be dumped quickly so it can continue with the excavation process. When dumping the bucket, the door must open quickly to evacuate the bucket and the contents of the bucket (plus door weight) force the door open when the door is unlatched from the bucket. After the contents are dumped, the door of the bucket closes under its own weight.

Figure 1:
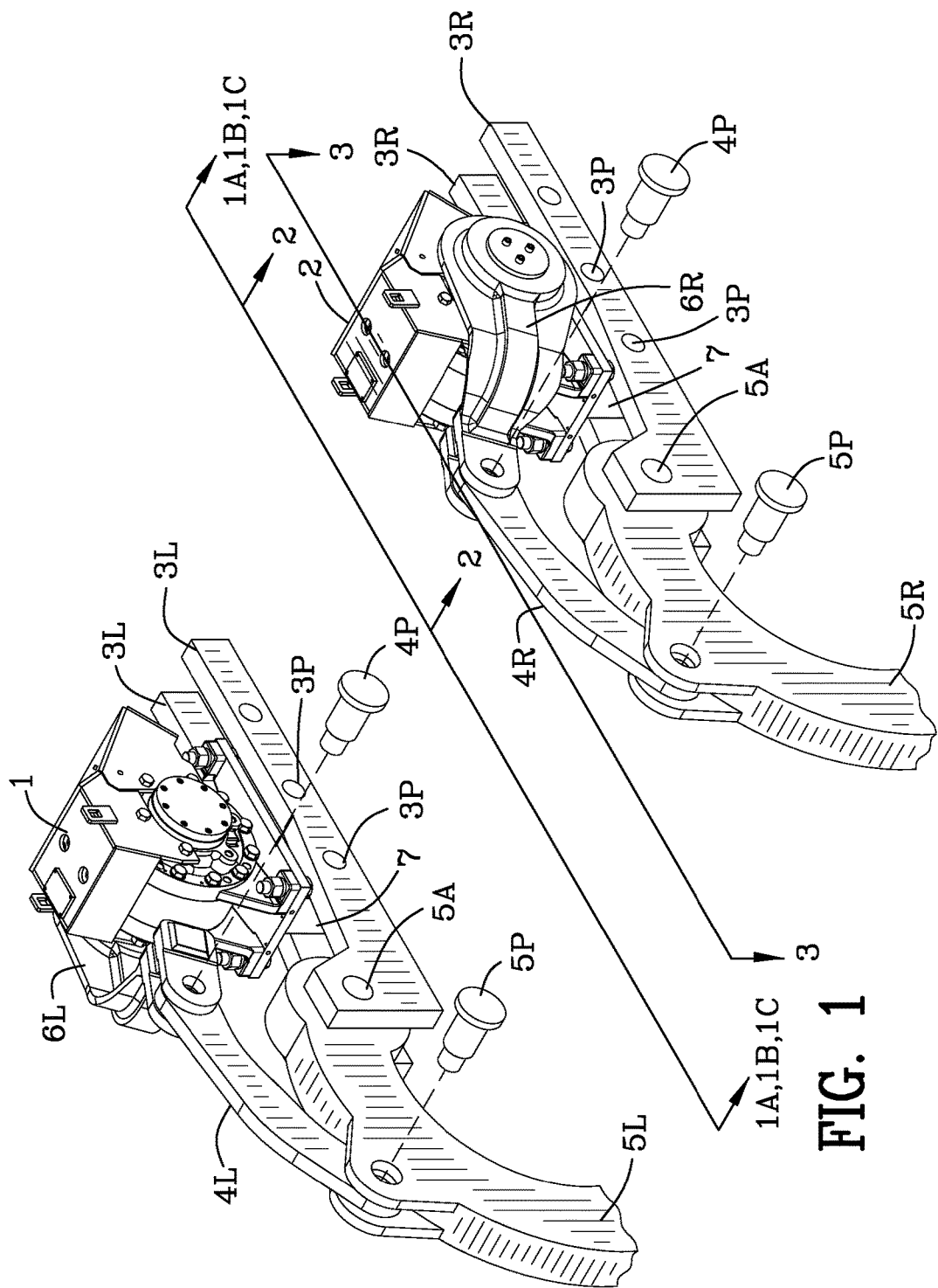
FIG. 1 is a perspective schematic view of the right and left hand dampeners on the bucket wherein the dampeners are pinned (connected) to mounting structures on top of the bucket, the dampener arms are connected to the bucket door linkage and the linkage attaches to the door mounting/pivot arm.

FIG. 1 is a perspective schematic view of the right hand dampener 2 and the left hand dampener 1 wherein the dampeners are pinned (connected) to mounting structures on top of the bucket (not shown). The dampener arms 6L, 6R are connected to the bucket door linkage 4L, 4R and the linkage attaches to a door pivot arm 5L, 5R. FIG. 1 illustrates a typical mounting configuration for the hydraulic dampeners. Pins 3P, 3P secure the dampener to the bucket structure 3L, 3R as illustrated in FIGS. 1, 1A, 1B, and 1C. Typically two dampeners, a right hand and a left hand dampener, are employed with a bucket. Right hand and left hand is determined when viewing the dampeners from the operator's seat and when viewing FIG. 1 from the left most part of the drawing sheet. Dampener assemblies 1, 2 are attached to the top of the bucket utilizing existing mounting structures 3L, 3R on the bucket.

Dampener arm 6L is connected to door linkage 4L. Movement of the door creates rotational movement about the door pivot 5A. The same movement also imposes a compression/tensile load through the door linkage 4L. Door linkage 4L loading is transmitted to the dampener arm 6L and causes a rotational movement of the arm 6L at the dampener 1.

In reference to dampener 2, dampener arm 6R is connected to door linkage 4R. Movement of the door creates rotational movement about the door pivot 5A. The same movement also imposes a compression/tensile load through the door linkage 4R. Door linkage 4R loading is transmitted to the dampener arm 6R and causes a rotational movement of the arm 6R at the dampener 2.

Figure 1A:
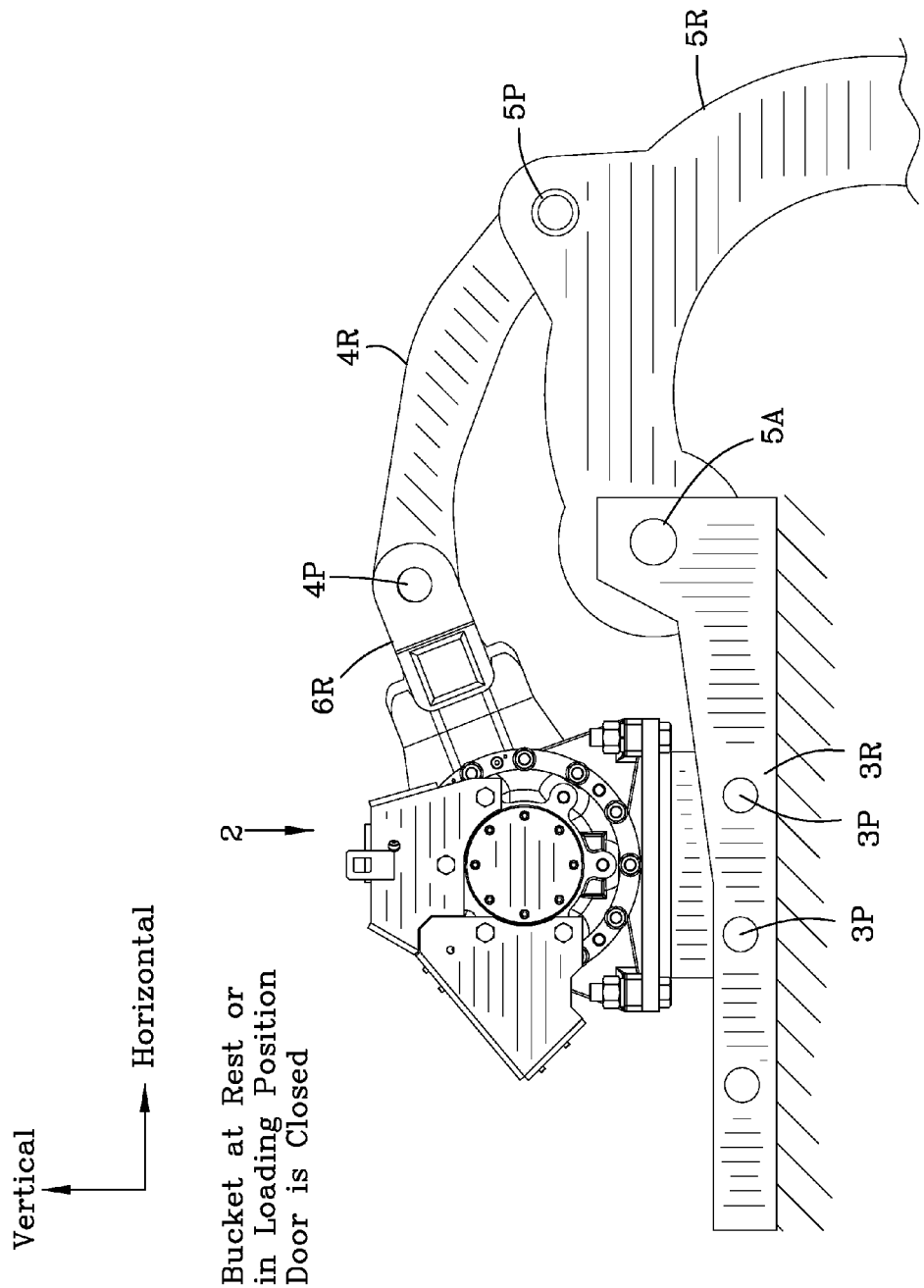
FIG. 1A is a schematic view of the right hand dampener mounted on top of the bucket with vertical and horizontal orientations shown from the perspective of line 1A-1A and with the bucket at rest or in the loading position with the door closed.

FIG. 1A is a schematic view of the right hand dampener 2 mounted on top of the bucket 3R with vertical and horizontal orientations shown from the perspective of lines 1A-1A of FIG. 1 and with the bucket at rest or in the loading position with the door closed. Bucket door linkage 5R is illustrated.

Figure 1B:
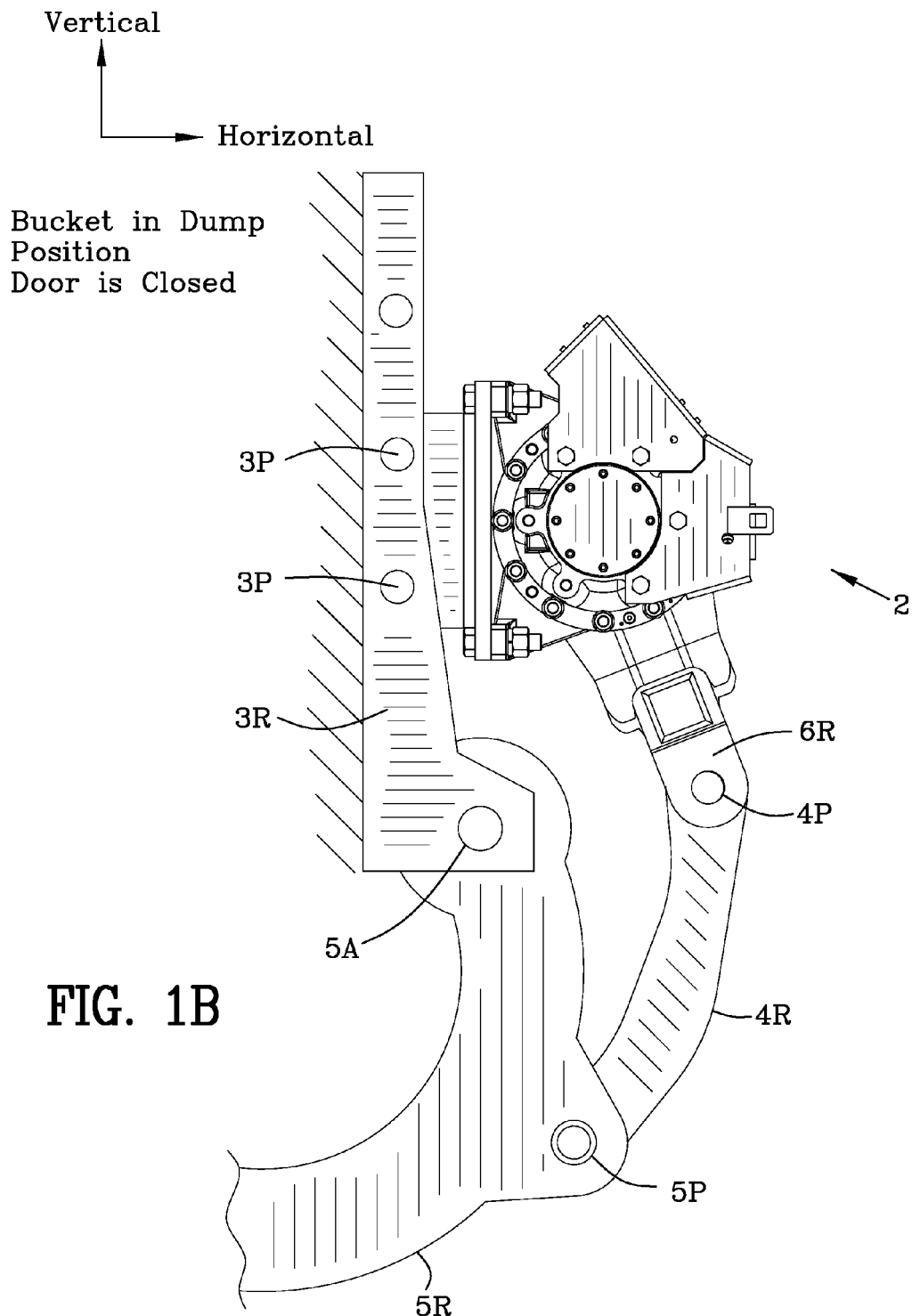
FIG. 1B is a schematic view of the right hand dampener mounted on top of the bucket with vertical and horizontal orientations shown from the perspective of line 1B-1B and with the bucket rotated in the dumping position with the door closed.

FIG. 1B is a schematic view of the right hand dampener 2 mounted on top of the bucket with vertical and horizontal orientations shown from the perspective of lines 1B-1B of FIG. 1 and with the bucket rotated in the dumping position and the door closed.

Figure 1C:
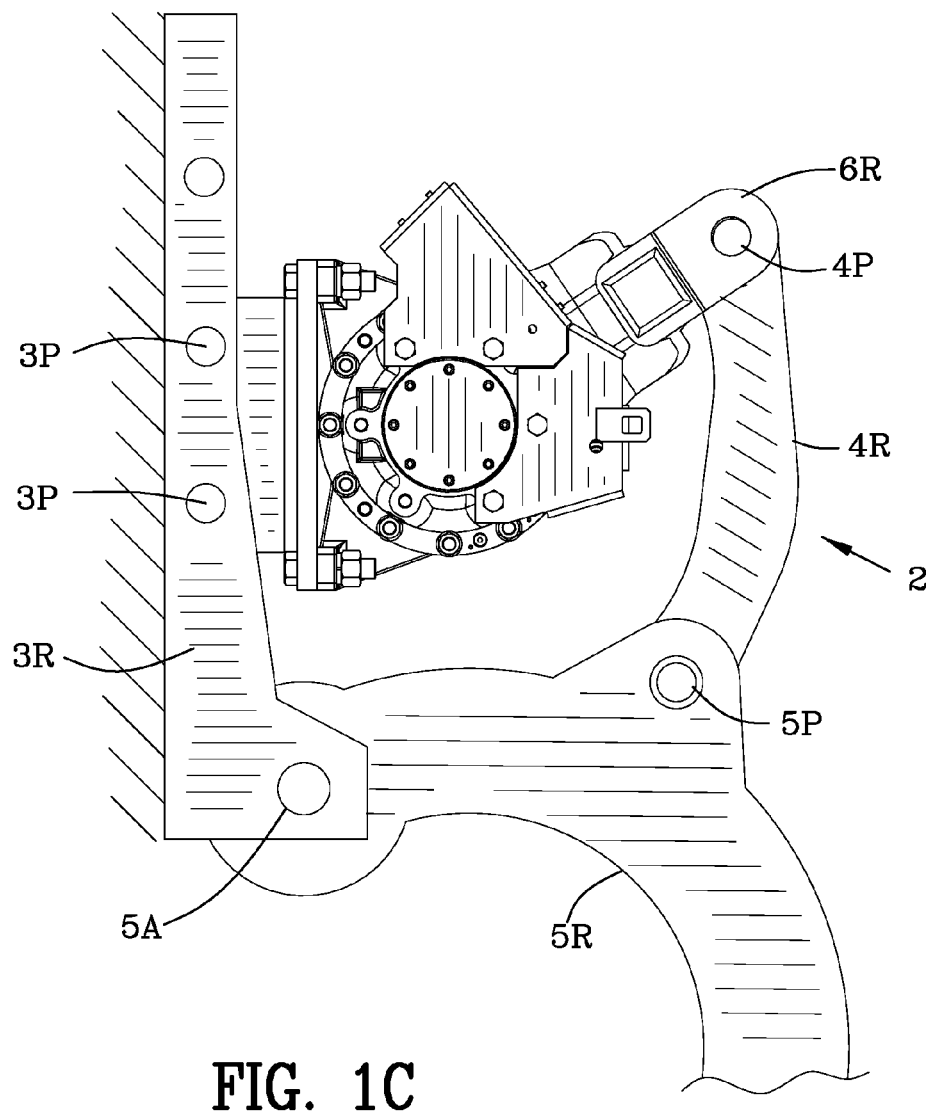
FIG. 1C is a schematic view of the right hand dampener mounted on top of the bucket with vertical and horizontal orientation shown from the perspective of line 1C-1C and with the bucket rotated in the dumping position and the door open.

FIG. 1C is a schematic view of the right hand dampener 2 mounted on top of the bucket, with vertical and horizontal orientations shown from the perspective of lines 1C-1C of FIG. 1, with the bucket rotated in the dumping position, and with the door open. Dampener arm 6R is illustrated rotated counter clockwise to the door open position when viewing FIG. 1C. Also see FIG. 7 wherein dampener arm 6R rotates counter clockwise to open the bucket door.

Figure 2:
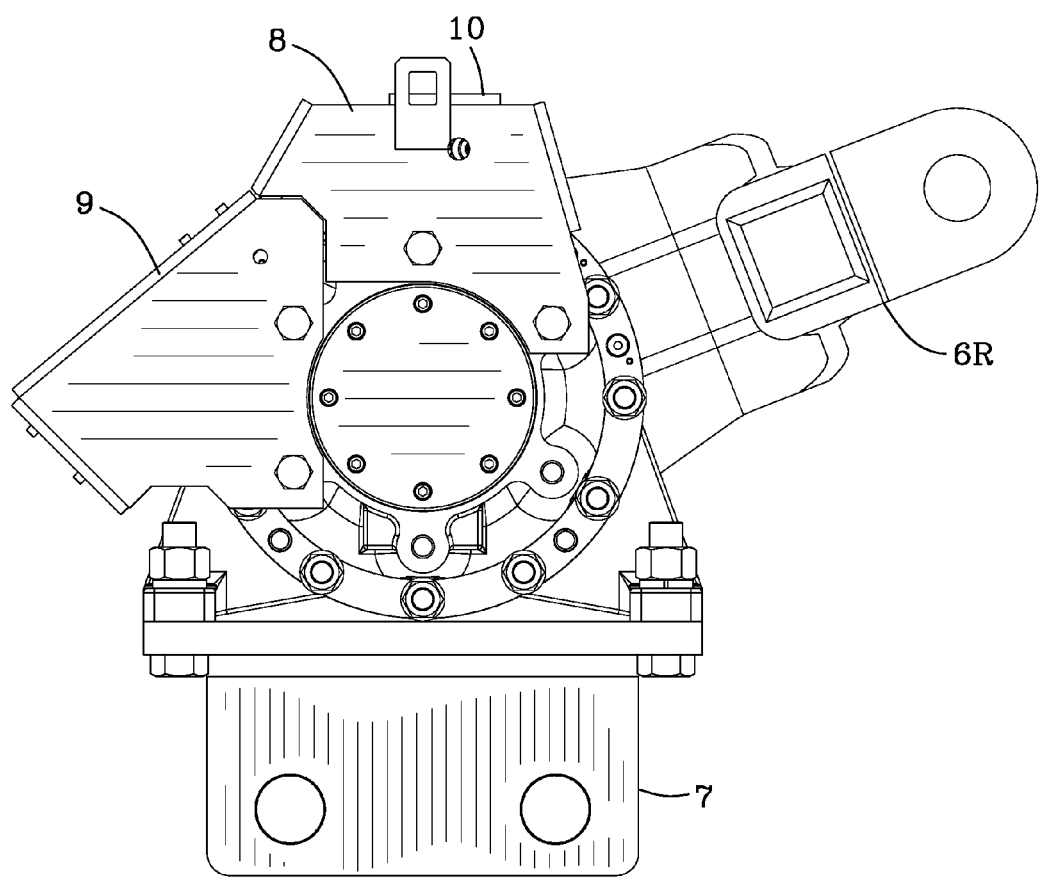
FIG. 2 is a side view of the right hand dampener assembly from the perspective of line 2-2 in FIG. 1.

FIG. 2 is a side view of a right hand dampener assembly from the perspective of line 2-2 in FIG. 1. Referring to FIG. 2, each dampener has a large bottom base plate 7. Pins are slid through the large holes in the base plate to secure the dampener to the bucket structure 3R, 3L.

FIG. 3 is a top view of a right hand dampener assembly from the perspective of line 3-3 in FIG. 1. FIG. 5 is a top view of a right hand dampener similar to FIG. 3 without the protective armor and dampener arm from the perspective of line 5-5 in FIG. 4. Referring to FIGS. 3 and 5, the dampener arm 6R has a mechanical spline connection on shaft 12 to transmit torque from one component to the other. Referring to FIG. 3, a shaft end plate 6A prevents the dampener arm 6 from sliding off the end of the shaft 12.

Referring to FIGS. 2 and 3, the dampener has a couple pieces of armor 8, 9 to protect various hydraulic fluid management components to be described later from damage during use. The primary manifold armor 8 has relief cut-outs to access fluid fill ports 11 as well as a removable cover plate 10 to access flow control valve 14 necessary for arm 6 positioning during installation of the dampener and which will be described later.

Figure 4:
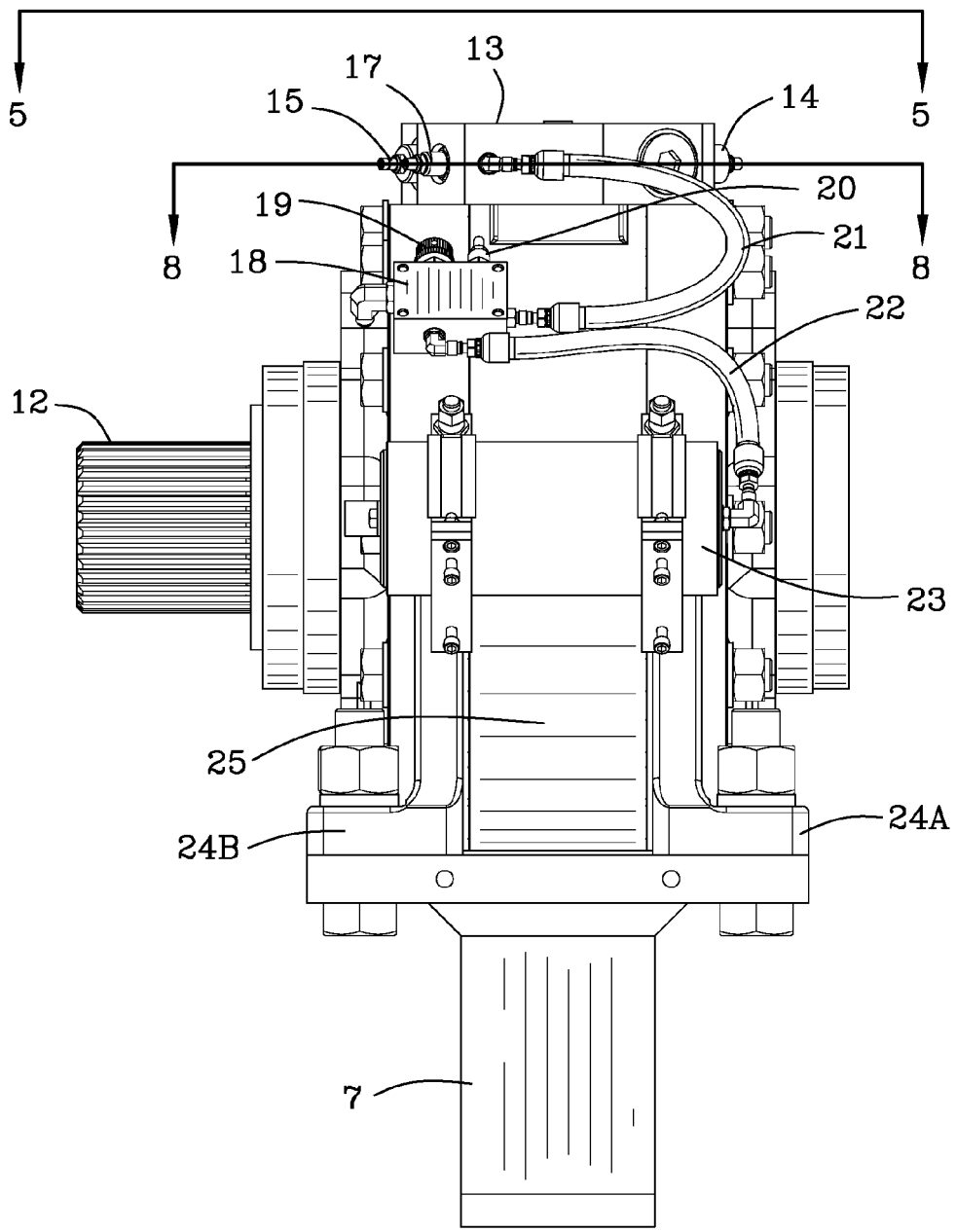
FIG. 4 is a rear view of the right hand dampener assembly similar to FIG. 3 without the protective armor and the dampener arm shown.
Figure 5:
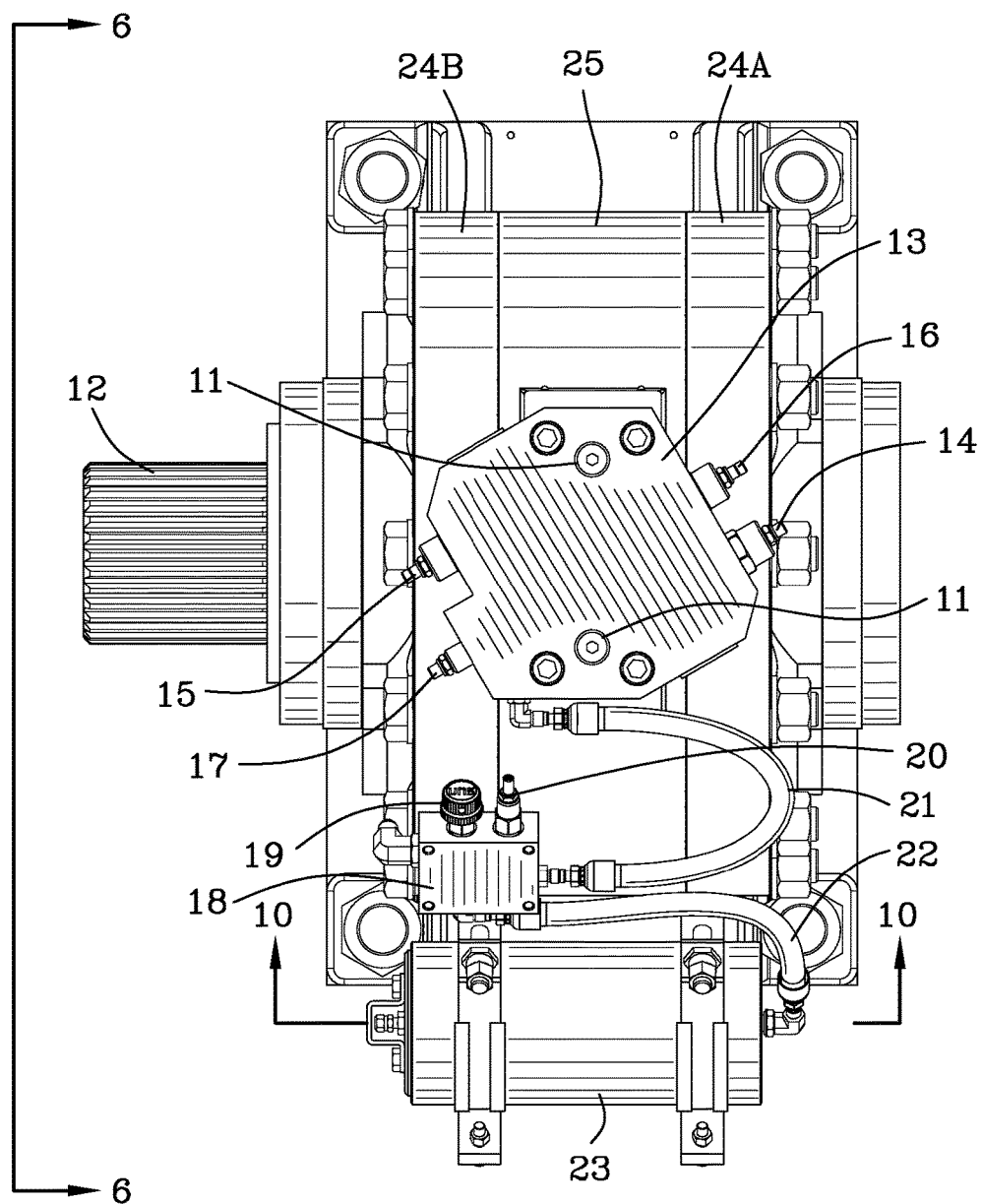
FIG. 5 is top view of the right hand dampener assembly similar to FIG. 3 without the protective armor and arm from the perspective of line 5-5 in FIG. 4.

FIG. 4 is a rear view of the right hand dampener assembly similar to FIG. 3 without the protective armor and arm shown. Referring to FIGS. 4 and 5, under the armor 8, 9, the dampener has a primary hydraulic manifold 13 housing two pressure relief valves 15, 16, a flow control valve 14, and a fluid diverter valve 17. A hose 21 connects the top/primary manifold to a secondary accumulator manifold 18. The accumulator manifold 18 houses a manual flow control valve 19 and a pressure relief valve 20. A second hose 22 connects the accumulator manifold 18 to the accumulator reservoir 23. Both the accumulator manifold 18 and accumulator reservoir 23 are held in place via the protective armor 9.

Figure 6:
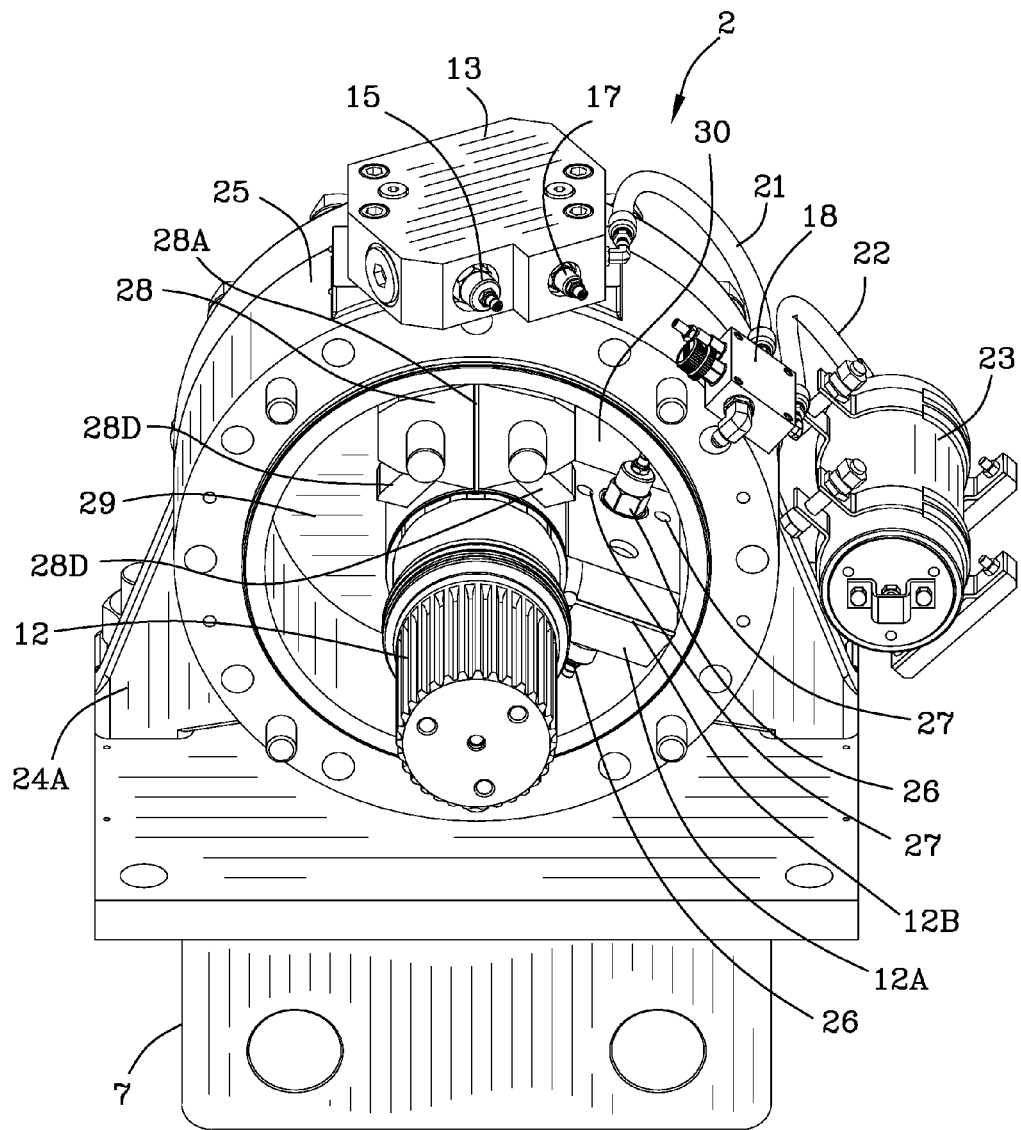
FIG. 6 is a perspective view of the right hand dampener from the perspective of line 6-6 in FIG. 5 without one head, the protective armor, and the dampener arm shown.

FIG. 6 is a perspective view of the right hand dampener 2 from the perspective of line 6-6 in FIG. 5 without one head 24B, the protective armor 8, 9, and the dampener arm 6R shown. Referring to FIGS. 5 and 6, the main dampener housing is composed of two heads 24A, 24B, a central body 25, the shaft 12, and an internal shoe 28. Only one head is shown in FIG. 6. FIGS. 4 and 5 illustrate heads 24A, 24B and the central body 25. Shaft 12 is axially and radially held in place by the heads 24A, 24B but is free to rotate. As shaft 12 rotates, shaft vane 12A rotates within the central body 25. Shaft 12 and shaft vane 12A are embodied within a single component. Shoe 28, shoe seals 28A, vane 12A, and vane seals 12B divide the central body 25 into two pressure-tight cavities 29, 30. Reference numeral 29 denotes the first central cavity and reference numeral 30 denotes the second central cavity.

The opening of the bucket door causes the shaft 12 to rotate in a clockwise (CW) direction as seen in FIG. 6 and in a counter-clockwise (CCW) direction as viewed in FIG. 7. Referring to FIG. 7, a CCW rotation will cause a pressure increase in the first central cavity 29 and a decrease in pressure in the second central cavity 30. High pressure in the first central cavity 29 will be transmitted to the first body port 31 leading to the primary manifold 13.

Figure 8A:
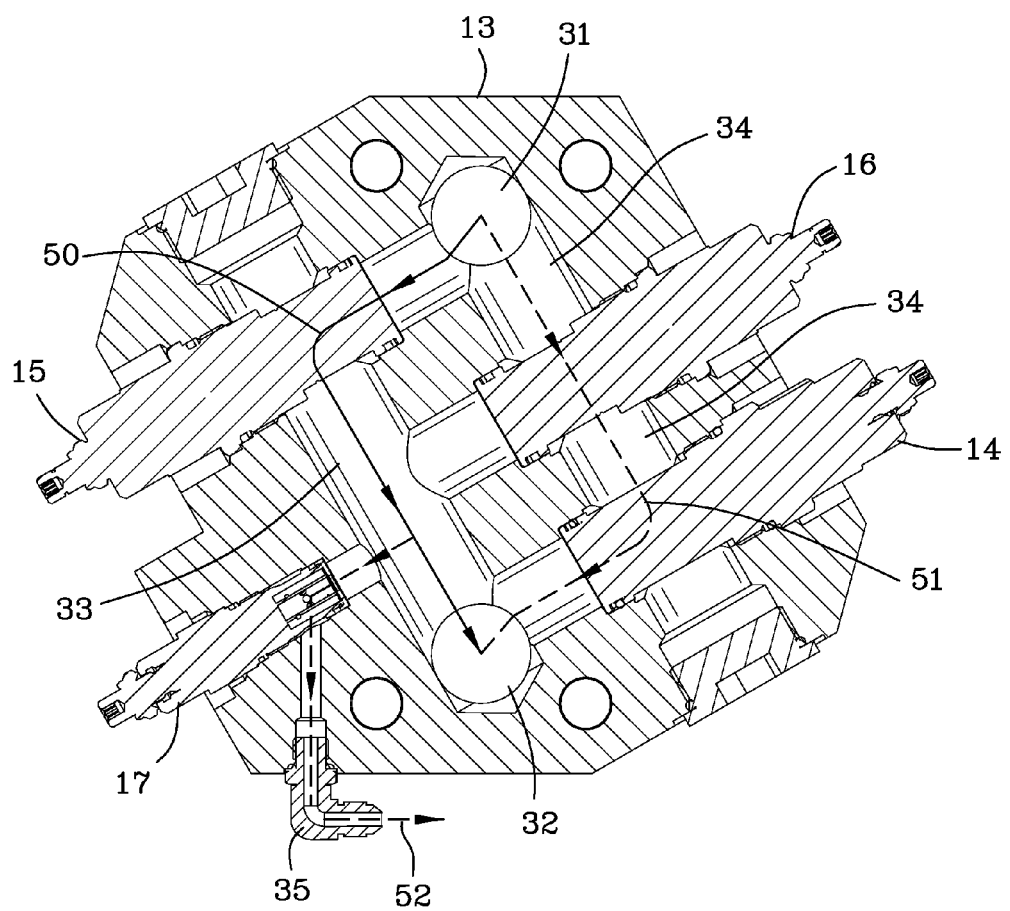
FIG. 8A is a cross-sectional view of the primary manifold in the door opening condition taken along the line 8-8 in FIG. 4.

FIG. 8A is a cross-sectional view of the primary manifold 13 taken along the line 8-8 in FIG. 4 and illustrates the door-opening condition. Referring to FIG. 8A, high pressure at the first body port 31 will pressurize second manifold passageway 34. At this point, pressure and the majority of flow are blocked by pressure relief valves 15, 16. A small regulated amount of fluid is able to flow through the flow control needle valve 14 and into the first manifold passageway 33 where it can reenter the dampener second central cavity 30 via second body port 32. However, the flow rate is negligible and pressure continues to increase in the second manifold passage 34.

Referring to FIG. 8A, primary flow path 50 is indicated by a solid line in the door opening cycle. Primary flow path 50 extends during the door open cycle from the first body port 31, through the door open pressure relief valve 15, first manifold passage 33, and into the second body port 32. Dashed line 51 indicates a secondary minimal flow path from first body port 31, second manifold passage 34, across the exterior of pressure relief valve 16, through needle valve 14 and into second body port 32. Dashed line 52 indicates a tertiary minimal flow path through diverter valve 17, manifold 13, fitting 35, and into the accumulator manifold 18 and accumulator reservoir 23.

Fluid pressure acts against all internal surfaces on the high pressure side of the dampener including the shaft vane 12A. Pressure multiplied by vane surface area multiplied by the average radial distance between the shaft vane 12A and the shaft rotation axis equates to a "dampening" or counter-torque that works against the rotation of arm 6 and shaft 12. Internal pressure will continue to rise until the opening pressure of relief valve 15 is reached. At that point, fluid can flow from the second manifold passageway 34 to the first manifold passageway 33 by traveling through the door open relief valve 15. Fluid flows from the first manifold passageway 33, through the second body port 32, and into the dampener housing second internal cavity 30. Shaft rotation, internal fluid flow, and dampening counter-torque will continue until the bucket door fully opens or comes in contact with an external stop.

The developed torque from the dampener can be adjusted. Referring to FIG. 8A, the opening pressure of the door open pressure relief valve 15 and the opening pressure of the door close pressure relief valve 16 directly affects the resistance torque of the dampener. Resistance torque increases as opening pressure increases and resistance torque decreases as opening pressure decreases. The opening pressures of each pressure relief valve 15, 16 are increased by turning the valve 15, 16 adjustment screw CW and reduced by turning the adjustment screw CCW. The valves 15, 16 and their adjustment screws are easily accessed by removing the primary manifold armor 8. This feature increases the flexibility of the dampeners. The same dampener can be used on multiple bucket platforms with the resistance torque adjusted accordingly.

Figure 8B:
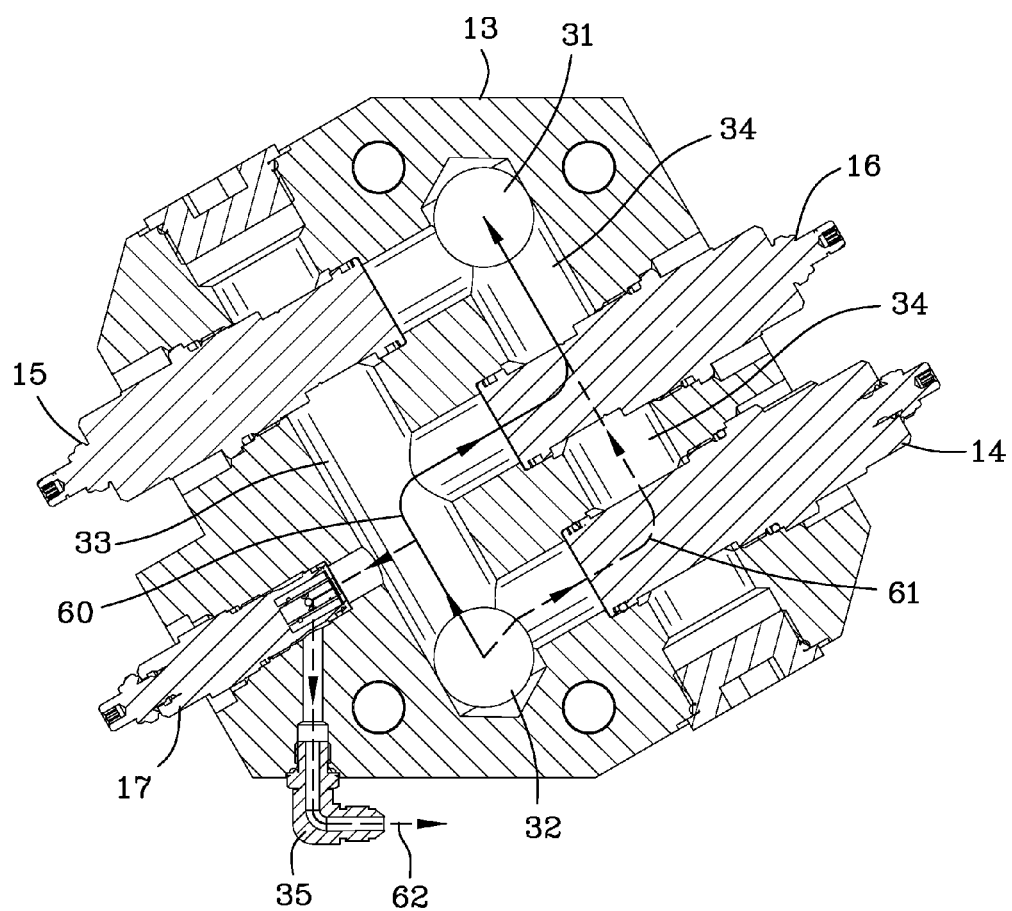
FIG. 8B is a cross-sectional view of the primary manifold in the door closing condition taken along the line 8-8 in FIG. 4.

FIG. 8B is a cross-sectional view of the primary manifold 13 taken along the line 8-8 in FIG. 4 which illustrates the door closing condition. The closing of the bucket door creates a CCW rotation of the shaft as seen in FIG. 6 and CW as seen in FIG. 7. Referring to FIGS. 7 and 8B, this creates high pressure in the second central cavity 30 and low pressure in the first central cavity 29. High pressure in second central cavity 30 pressurizes second body port 32 and first manifold passageway 33. Referring to FIG. 8B, at this point fluid pressure and the bulk of fluid flow are stopped by the door close pressure relief valve 16 and the door open pressure relief valve 15. A small quantity of hydraulic fluid is able to flow 61 through the flow control needle valve 14 where it can reenter the dampener via first body port 31 and then into first central cavity 29 which is at relatively low pressure. In addition, a small quantity of fluid can also pass through the diverter valve 17, manifold 13, and fitting 35 where it can then travel to the accumulator manifold 18 and accumulator reservoir 23. However, fluid loss through the flow control valve 14 and diverter valve 17 is negligible and fluid pressure continues to rise in the first manifold passageway 33. Fluid pressure acts on all internal surfaces on the high pressure side of the dampener including the shaft vane 12A. Fluid pressure multiplied by the shaft vane 12A surface area multiplied by the average radial distance from the shaft vane 12A to the shaft axis of rotation equates to a dampening or counter-torque to resist shaft rotation. Pressure continues to rise in the high pressure cavities 30, 32, and 33 until the opening pressure of the door close pressure relief valve 16 is reached. At that point fluid is able to flow from second body port 32, into first manifold passageway 33, through relief valve 16, through second manifold passageway 34 which is at low pressure, through the first body port 31, and into the first central cavity 29 which is at low pressure. Arm 6, shaft 12, and shaft vane 12A rotation as well as the dampening torque continue until the door comes to a stop.

Referring to FIG. 8B, primary flow path 60 is indicated by a solid line in the door close cycle. Primary flow path 60 extends through second body port 32, first manifold passageway 33, door close relief valve 16, second manifold passageway 34, and first body port 31. Dashed line 61 indicates a secondary minimal flow path through needle valve 14, across the exterior of door close relief valve 16 and into the first body port 31. Dashed line 62 indicates a tertiary minimal flow path through diverter valve 17, manifold 13, and fitting 35 to the accumulator manifold 18 and accumulator reservoir 23.

The invention has an additional feature to protect itself from pressure spikes. Occasionally, entire sections of wall will collapse during material removal. Operators are instructed to open the bucket door during collapse events to reduce damage to the bucket. Due to the weight of the door, the weight of material within the bucket, and kinetic energy added from falling debris, door rotational/accelerations speeds can be very fast. This has the potential to create large pressure spikes within the dampener and subsequent damage. To reduce damage from this or other pressure spike instances, additional pressure relief valves 26 have been installed in either face of the shaft vane 12A. See FIGS. 6, 7, 12, 12A, and 12B. FIG. 12 is an illustration of the dampener shaft 12 such its overall design can be seen. FIG. 12A is a section view of the shaft vane 12A along the line 12A-12A in FIG. 12. FIG. 12B is a section view of the shaft vane 12A along the line 12B-12B in FIG. 12. The pressure valves 26 sense pressure on the opposite sides of vane 12A from which they are installed. Once pressure reaches the opening pressure of the valves 26, fluid is able to flow into the valves 26, through the vane passageways 27, and out the opposite side of the vane to the low pressure cavity. In this way, fluid is able to bypass the external primary manifold 13 and flow directly from one internal cavity to the other. This flow is in addition to the flow that travels via the normal route through the manifold 13 described previously. The added flow capacity reduces internal pressure and related over-pressurization damage. The shaft vane 12A pressure relief valves 26 are installed in opposite faces of the vane such that the dampener has protection from pressure spikes in either shaft rotation direction.

The pressure relief valves 26 opening pressure is factory-set near the maximum recommended pressure and is not accessible or adjustable in the field. Because of this, the shaft vane valves 26 also help to protect the dampener from excessive pressure adjustment of the primary manifold 13 pressure relief valves 15, 16. The primary manifold 13 pressure relief valves 15, 16 can be field-adjusted to reduce dampener output torque or can be field-adjusted up to the maximum recommended dampener pressure. Any further adjustment of the external valves 15, 16 will cause an increasing amount of fluid to be diverted through the shaft vane valves 26 thereby reducing potential damage from maladjustment of the external valves 15, 16.

Referring to FIG. 7, channels 28B, 28C are illustrated in shoe 28 and these facilitate flow through the first body port 31 and second body port 32. Shoe stop 28D engages vane 12A preventing over travel of vane 12A and pressure relief valves 26. In this way relief valves 26 do not engage the shoe 28.

The invention incorporates structure to prevent overpressurization from heat. As the dampeners are cycled, heat is generated as fluid flows across the relief valves 15, 16, and 26, see FIGS. 6, 7. An operator controls the bucket operation. The dampeners are cycled through the operation of the bucket and the door which holds the contents of the bucket in place. The door is alternately closed and opened. When the bucket door is closed by the operator, the bucket is used to scoop up (pick up) earthen material or minerals or the bucket is used to dig into (pick up) earthen material or minerals. When the bucket door is opened, the contents of the bucket fall out and are dumped.

The dampeners transform the kinetic energy removed from the swinging door into heat at the dampener pressure relief valves 15, 16, and 26. Heat migrates throughout the dampener structure and component temperatures increase until a temperature equilibrium is reached where the dampener dissipates heat to the surrounding atmosphere and bucket structure at an equal rate as it is created. If a fully enclosed dampener is filled completely with oil and the oil experiences an increase in temperature, its volumetric expansion will greatly exceed the fixed volume of the dampener housing and manifold due to the differences in the coefficient of thermal expansion of the hydraulic fluid and the metallic parts of the dampener. A substantial portion of the dampener and manifold is made of metal. Since hydraulic fluid is essentially non-compressible, a pressure spike is seen throughout the dampener on both sides of the shaft vane 12A. Internal pressure will continue to increase proportional to temperature until a weak area in the structure of the dampener gives way and fluid is allowed to escape or expand its volume. The weak area is typically at a seal and the dampener may lose oil and become operationally ineffective.

The invention moves small quantities of oil to an external accumulator reservoir 23, see FIGS. 4, 6, 7, 10A, and 10B. Referring to FIGS. 8A and 8B, whenever first manifold passageway 33 is suitably pressurized (pressure higher than that found in accumulator reservoir 23), diverter valve 17 allows fluid to move to and through the fitting 35 where it travels by way of conduit 21 (hose) to a secondary accumulator manifold 18, through a second conduit 22 (hose), and then to the external accumulator reservoir 23. The diverter valve 17 is adjusted such that when the manifold first passageway 33 is suitably pressurized, a small metered stream of fluid is allowed to pass into the manifold fitting 35. The accumulator downstream from manifold fitting 35, will not experience large pressure variations in the dampener. In addition, the diverter valve 17 prevents large quantities of fluid from passing into the accumulator whenever the dampener goes through an open or close cycle. The diverter valve highly restricts fluid going into the accumulator; however, fluid coming into the dampener from the accumulator is unrestricted. If the dampener is experiencing internal pressure from fluid expansion, the first manifold passageway 33 will be pressurized for a longer period of time and more fluid will be diverted to the accumulator reservoir 23. Proper dampener fluid level is maintained by the constant metering-out of fluid to the accumulator reservoir 23, and return of fluid from the accumulator to the dampener.

It is specifically envisioned that conduits other than hoses may be used to interconnect the fittings 35, 36, 37, and 23E. For instance, and without limitation, the conduit could be metal tubing, a metal reinforced hose, or braided metal conduit.

Figure 10A:
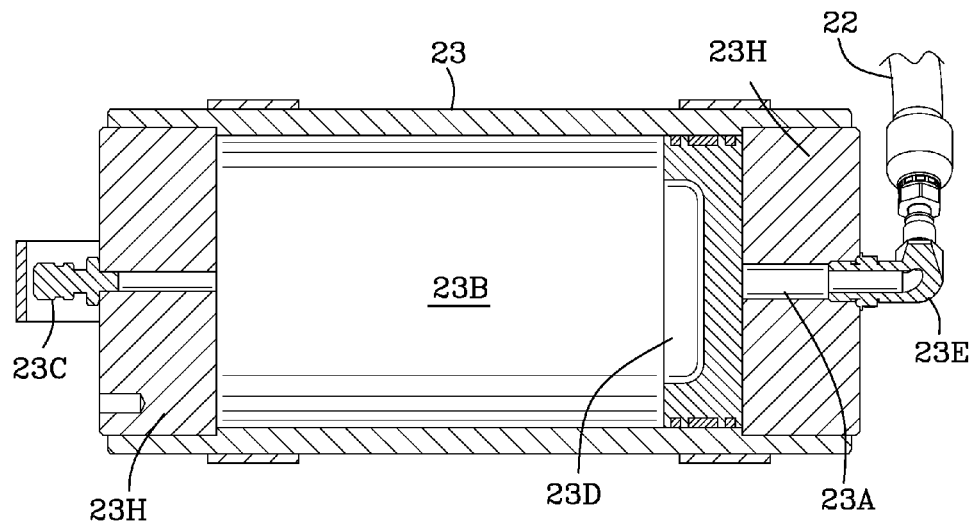
FIG. 10A is a cross-sectional view of the accumulator in the start-up condition with oil at ambient temperature taken along the line 10-10 in FIG. 5.

FIG. 10A is a cross-sectional view of the accumulator reservoir 23 taken along the line 10-10 in FIG. 5 as it appears upon initial start-up when the dampener is at ambient temperature. The accumulator 23 is composed of a central cylindrical body with heads 23H, 23H on both sides thereof The interior of the accumulator is separated into two pressure tight cavities by a moveable/sliding piston 23D. One side of the piston 23D the accumulator is full of compressed gas 23B. On the other side of the piston, the accumulator is full of hydraulic oil 23A. The gas 23B is pressurized nitrogen gas which is introduced through the gas charge fitting 23C into the accumulator prior to installation. The pressure of the initial nitrogen gas charge is high enough: to overcome any friction from movement of the piston 23D, and, to pressurize the hydraulic oil 23A to overcome pressure losses through fittings, valves, and tubing up to the dampener. This induced positive pressure attempts to return fluid back to the dampener. The pressure induced by the accumulator permeates throughout the dampener and becomes the starting (low) pressure of the dampener. The dampener pressure relief valves 15, 16, 26 opening pressures are based on set pressure differences between low and high pressure sides of the dampener. As a result, the absolute pressure on both the low and high pressures sides of the dampener will vary based on the gas pressure induced into the system from the accumulator. Upon initial start-up, due to gas pressure, the accumulator piston 23D will be up against the head on the hydraulic side of the accumulator and the accumulator will contain relatively little oil. However, there will be hydraulic fluid (oil) in the conduits 21, 22 and the accumulator manifold 18.

Figure 10B:
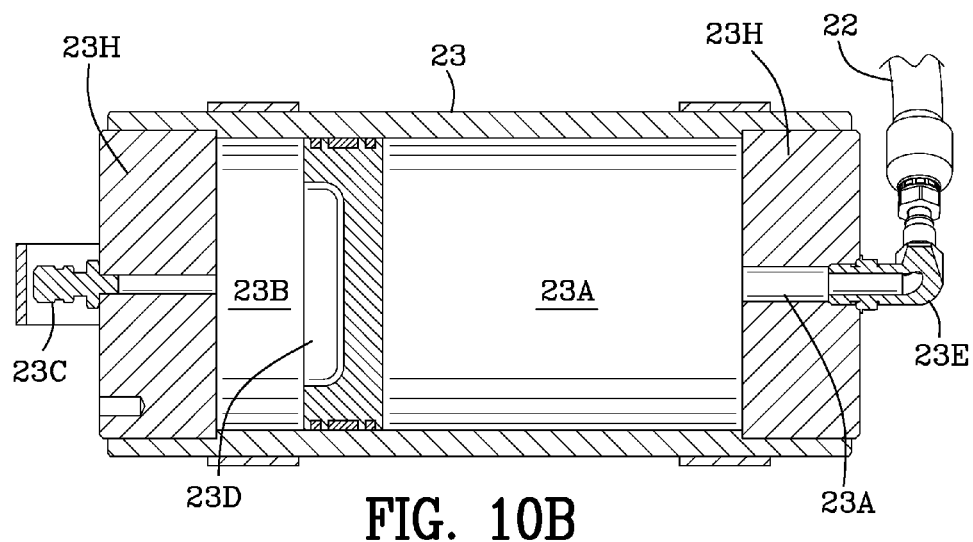
FIG. 10B is a cross-sectional view of the accumulator with oil at expected maximum operating temperature taken along line 10-10 in FIG. 5.

FIG. 10B is a cross-sectional view of the accumulator reservoir 23 taken along the line 10-10 in FIG. 5 as it appears after the dampener has been working at an elevated temperature and the oil volume has expanded and filled a significant portion of the oil-side 23A of the accumulator. Due to reduction of volume and higher temperature, the gas 23B pressure rises and imposes a larger force on the piston than on initial start-up. The piston 23D in turn transmits this force to the hydraulic fluid 23A. The pressure imposed on the fluid 23A will attempt to force it to a lower pressure area. As such, some of the fluid in the accumulator 23 flows back into the dampener where needed and becomes the low/starting pressure in the dampener. As the dampener temperature increases, the hydraulic oil will expand and fill a larger portion of the accumulator, which will induce a higher pressure on the oil in the accumulator, which then induces a higher starting (low) pressure value in the dampener, which then causes a higher absolute top-end working pressure since the relief valves 15, 16, 23 pressure settings are based on a set "delta" pressure over the starting/low pressure level. Therefore, proper sizing (volume capacity) of the accumulator reservoir is important otherwise an excessive high pressure can be induced back into the dampener.

Figure 9:
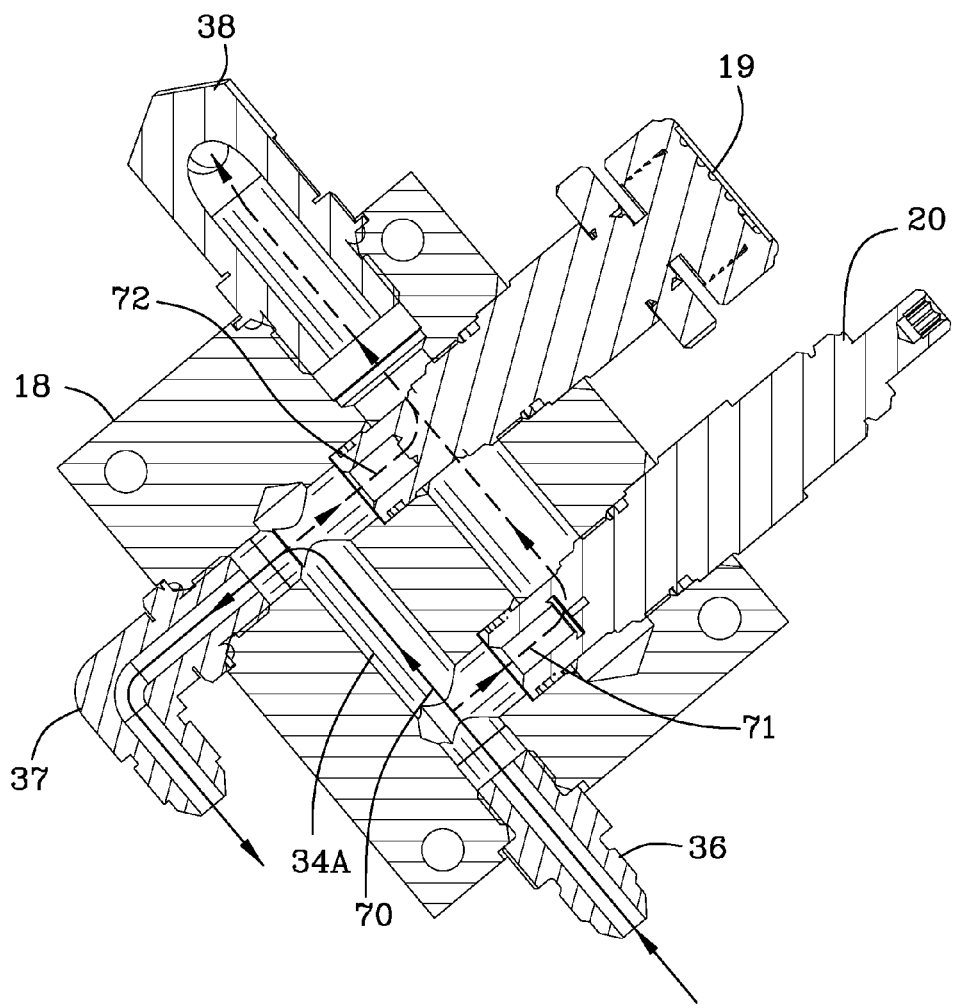
FIG. 9 is a cross-sectional view of the accumulator manifold taken along the line 9-9 in FIG. 7.
Figure 11:
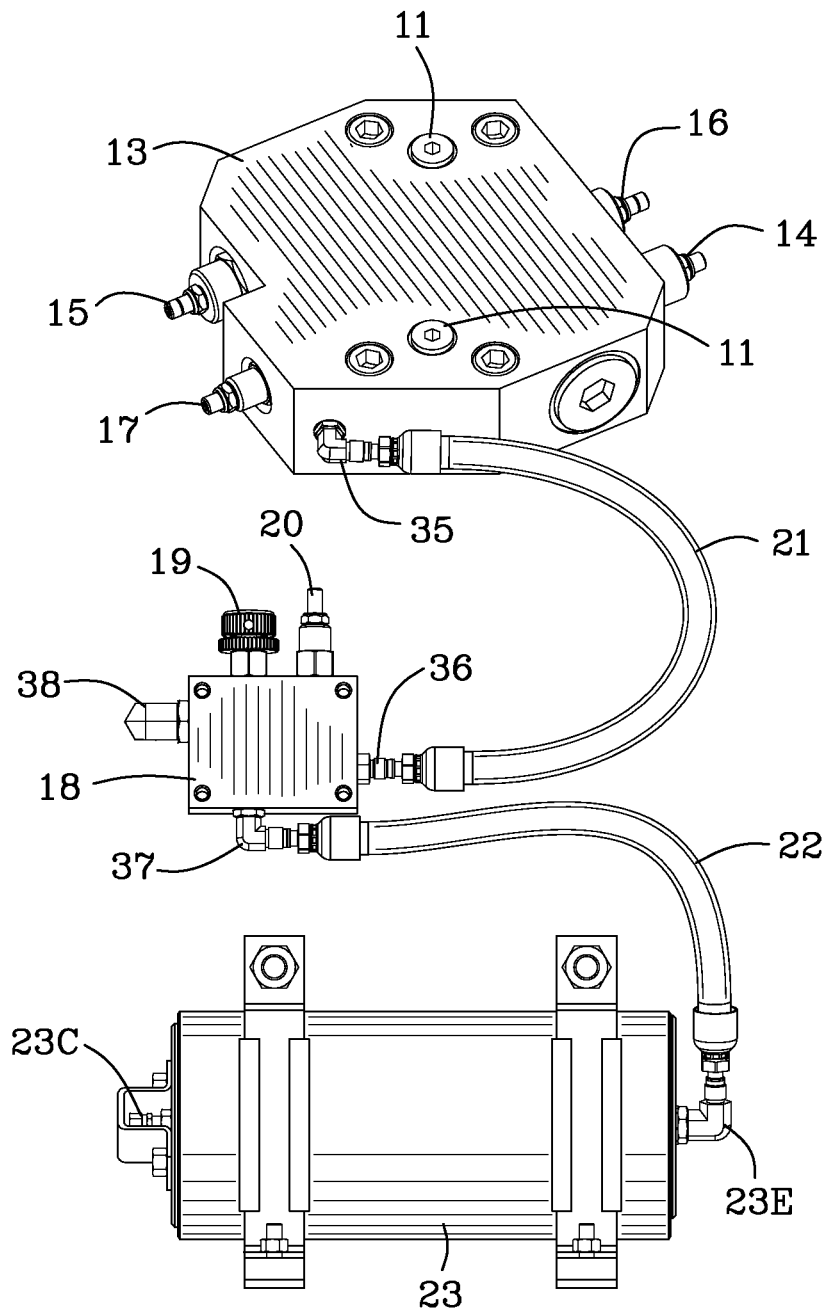
FIG. 11 is a perspective view illustrating the position of the primary manifold, accumulator manifold, accumulator reservoir, as well as, the interconnecting hosing.

FIG. 9 is a cross-sectional view of the accumulator manifold 18 taken along the line 9-9 in FIG. 7. Referring to FIGS. 9 and 11, hydraulic fluid leaves the dampener via fitting 35 on the primary manifold 13. From there it travels down conduit 21 where it enters the accumulator manifold 18 via fitting 36. Inside the manifold 18, the fluid travels through passageway 34A and then out again via fitting 37 where it then travels down conduit 22 and into the accumulator reservoir 23. As discussed previously, as the dampener works, heat is generated and the hydraulic fluid expands into the accumulator reservoir 23, and the accumulator in-turn imposes a counter-pressure back onto the fluid attempting to return it to the dampener. This counter pressure then becomes the low/starting pressure of the dampener. During normal operation, fluid simply travels unaffected back and forth through the accumulator manifold 18. Depending on specific operating conditions and design specifications, the accumulator-induced counter-pressure can be relatively high and should be relieved prior to servicing the dampener. A manual pressure relief valve 19 is installed in the accumulator manifold 18. The valve 19 can be opened using hand pressure on a knurled knob at the top of the valve. Turning the knob CCW opens the valves and sends pressurized fluid out of the dampener via fitting 38 thereby reducing internal pressure and making the dampener safer to service. In addition, the invention incorporates another pressure relief valve 20 into the accumulator manifold 18. The valve 20 senses the difference in fluid pressure between the accumulator side of the system, specifically in passage 34A in the accumulator manifold, and compares it to atmospheric pressure. If the pressure differential exceeds that of the open pressure of the relief valve 20, fluid will automatically be sent out of the dampener via fitting 38 until the pressure reduces to a proper level where the relief valve will close and block further release of oil. This feature prevents the dampener from over-pressurizing due to abnormal events such as excessive operating temperature.

Referring to FIG. 1, the invention incorporates a feature to aid attachment of the arm 6 to the door linkage 4. The manifold armor 8 has a removable cover 10 as seen in FIG. 3. Removing the cover plate 10 allows the installer access to the flow control valve 14 as seen in FIG. 5, 8A, and 8B which is adjustable. Backing-off the adjustment screw allows fluid to travel freely between manifold passages 33, 34 without building pressure, and counter-torque, reference FIGS. 8A and 8B. As a result the shaft 12 and arm 6 are able to freely rotate and allows the installer to line-up the arm 6 with the door linkage 4. After installation, the adjustment screw is fully tightened and then backed-off a specified fraction of a turn.

The invention allows door travel even when dampener internal pressures are not sufficient to open relief valves 15, 16, and 26. Depending on the relative alignment at any particular time between the center of gravity of the door, the door pivot point, and bucket frame in combination with the kinetic energy of the door, there is potential that the counter-torque produced by the dampeners equal that induced by the movement of the bucket door and the door stops prior to closing. Referring to FIGS. 8A and 8B, in this scenario, the pressure inside the manifold 13 lowers to a point below the opening pressure of the relief valves 15, 16, and 26 and flow through them is stopped. However, the flow control valve 14 when properly adjusted as described previously will still allow fluid to pass in either direction but at a relatively slow rate. The effect of this is that the shaft 12, dampener arm 6, and bucket door assembly will continue to rotate at a much reduced rate until the door closes or until the door center of gravity relative to its pivot point prevents further rotation.

REFERENCE NUMERIALS 1 left hand dampener
2 right hand dampener
3L bucket structure to mount dampener
3R bucket structure to mount dampener
3P pins securing the dampener to the bucket structure 3L, 3R
4L bucket linkage arm to connect dampener arm 6L to bucket door mounting arm 5L
4R bucket linkage arm to connect dampener arm 6R to bucket door mounting arm 5R
4P pin to connect dampener arm to bucket linkage arm
5A door pivot
5L bucket door mounting arm
5R bucket door mounting arm
5P pin to connect door mounting arm to bucket linkage arm
6A dampener arm end plate
6L dampener arm
6R dampener arm
7 dampener mounting base
8 primary manifold and valve armor
9 accumulator reservoir and accumulator manifold mounting and protective armor
10 arm position valve access plate
11 dampener oil fill ports
12 vane shaft one piece assembly
12A shaft vane
12B shaft vane seal
13 primary manifold
14 arm position valve
15 door open pressure relief valve
16 door close pressure relief valve
17 fluid diverter valve
18 accumulator manifold
19 manual pressure relief valve
20 accumulator system pressure relief valve
21 primary manifold to accumulator manifold supply/return hose
22 accumulator manifold to accumulator reservoir supply/return hose
23 hydraulic oil accumulator reservoir
23A hydraulic oil side of accumulator
23B pressurized gas side of accumulator
23C gas charge valve
23D movable piston
23E accumulator oil inlet fitting
23H accumulator head
24A dampener head
24B dampener head
25 dampener central body
26 vane pressure valves
27 vane pressure valve relief passages
28 shoe
28A shoe seal
28B, 28C channels in shoe
28D stop
29 first central cavity
30 second central cavity
31 first body port
32 second body port
33 first manifold passageway
34 second manifold passageway
34A passageway in the accumulator manifold 18
35 diverter valve fitting
36 accumulator manifold inlet fitting
37 accumulator manifold outlet fitting
38 accumulator manifold overflow fitting
50 primary flow path during door open cycle through first body port 31, door open pressure relief valve 15, first manifold passageway 33, and into second body port 32
51 dashed line indicating secondary minimal flow path 52 dashed line indicating a tertiary minimal flow path through diverter valve 17, manifold 13, and fitting 35 to the accumulator manifold 18 and accumulator 23

60 primary flow path during door close cycle through second body port 32, first manifold passageway 33, door close relief valve 16, second manifold passageway 34, and into body first port 31

61 dashed line indicating secondary minimal flow path 62 dashed line indicating a tertiary minimal flow path through diverter valve 17, manifold 13, fitting 35, and onto accumulator manifold 18 and accumulator 23

70 primary flow path in accumulator manifold 18, fluid enters via fitting 36, through passageway 34A, and exits to accumulator via fitting 37

71 dashed line indicating a secondary flow path used when high pressure is found in the accumulator-side of the system, fluid travels through passageway 34A, into pressure valve 20, and exits the manifold and dampener via fitting 38.

72 dashed line indicating a tertiary flow path used when pressure in accumulator-side of the system is manually reduced, fluid travels through passageway 34A, into flow valve 19, and exits the manifold and dampener via fitting 38

The invention claimed is:

1. A dampener, comprising:
a housing;
an accumulator reservoir, said accumulator reservoir holds hydraulic fluid;
a rotating shaft;
a vane integral with said rotating shaft and rotating therewith;
said housing includes a first central cavity and a second central cavity separated by said vane;
said housing includes a first body port and a second body port;
a primary manifold;
hydraulic fluid in said first central cavity of said housing, said second central cavity of said housing, said primary manifold, said first body port, said second body port, and said accumulator reservoir;
said primary manifold controls fluid flow within said dampener;
said primary manifold includes a first passageway and a second passageway;
said first body port in communication with said first passageway of said primary manifold and said first central cavity of said housing;
said second body port in communication with said second passageway of said primary manifold and said second central cavity of said housing;
said primary manifold includes a diverter valve in communication with said second passageway of said primary manifold and said accumulator reservoir;
hydraulic fluid flows bidirectionally between said second passageway of said primary manifold and said accumulator reservoir depending on the pressure in said second passageway in relation to the pressure in said accumulator reservoir;
said diverter valve restricts hydraulic fluid flow to said accumulator reservoir from said second passageway when said pressure in said second passageway increases;
said diverter valve includes an unimpeded passageway therethrough for reverse flow from said accumulator reservoir to said second passageway;
said accumulator reservoir includes a piston within a cylinder, said cylinder being closed on a first end and said cylinder being open and in communication with said dampener on a second end;
said piston includes a first side and a second side; and,
said accumulator reservoir includes gas on said first side of said piston within said closed first end of said cylinder, and, said accumulator reservoir includes hydraulic fluid on said second side of said piston within said cylinder.

2. A dampener as claimed in claim 1, wherein:
said primary manifold is under varying pressure, hydraulic fluid flows into and out of said second passageway of said primary manifold from and to said accumulator reservoir in response to said varying pressure.

3. A dampener as claimed in claim 1, further comprising:
said integral vane includes a first pressure relief valve oriented to actuate when said integral vane is moving in a first direction.

4. A dampener as claimed in claim 1, further comprising:
said integral vane includes a second pressure relief valve oriented to actuate when said integral vane is moving in a second direction.

5. A dampener, comprising:
an accumulator reservoir, said accumulator reservoir stores hydraulic fluid;
a primary manifold, said primary manifold controls hydraulic fluid flow within said dampener;
a conduit interconnecting said primary manifold and said accumulator reservoir;
said primary manifold includes a diverter valve in fluidic communication with said hydraulic fluid in said primary manifold, said conduit interconnecting said primary manifold and said accumulator reservoir, and, said hydraulic fluid within said accumulator reservoir;
hydraulic fluid flows bidirectionally between said primary manifold and said accumulator reservoir;
said accumulator reservoir includes a piston within a cylinder, said cylinder being closed on a first end and said cylinder being open and in communication with said dampener on a second end;
said piston includes a first side and a second side; and,
said accumulator reservoir includes gas on said first side of said piston within said closed first end of said cylinder, and, said accumulator reservoir includes hydraulic fluid on said second side of said piston within said cylinder.

6. A dampener as claimed in claim 5, further comprising:
a diverter valve, said diverter valve restricts hydraulic fluid flow to said accumulator reservoir from said second passageway when said pressure in said second passageway increases;
said diverter includes an unimpeded passageway therethrough for reverse flow from said accumulator reservoir to said second passageway.

7. A dampener as claimed in claim 5, wherein:
said primary manifold is under varying pressure, hydraulic fluid flows into and out of said second passageway of said primary manifold from and to said accumulator reservoir in response to said varying pressure.

8. A dampener as claimed in claim 5, further comprising:
a charging fitting resides in said closed first end of said cylinder of said accumulator reservoir, said charging fitting admits gas into said closed first end of said cylinder of said accumulator reservoir.

9. A dampener, comprising:

an accumulator reservoir, said accumulator reservoir stores hydraulic fluid;

a primary manifold, said primary manifold controls hydraulic fluid flow within said dampener;

a conduit interconnecting said primary manifold and said accumulator reservoir;

said primary manifold includes a diverter valve in fluidic communication with said hydraulic fluid in said primary manifold, said conduit interconnecting said primary manifold and said accumulator reservoir, and, said hydraulic fluid within said accumulator reservoir;

hydraulic fluid flows bidirectionally between said primary manifold and said accumulator reservoir; and, an accumulator manifold interposed between said primary manifold and said accumulator reservoir, said accumulator manifold in fluidic communication with said primary manifold and said accumulator reservoir.

10. A dampener as claimed in claim 9, further comprising:
said accumulator manifold includes an accumulator manifold pressure relief valve.

11. A dampener as claimed in claim 9, further comprising:
said accumulator manifold includes a manually operated accumulator manifold pressure relief valve.

12. A dampener, comprising:

a housing;

an accumulator reservoir, said accumulator reservoir holds hydraulic fluid;

a rotating shaft;

a vane integral with said rotating shaft and rotating therewith;

said housing includes a first central cavity and a second central cavity separated by said vane;

said housing includes a first body port and a second body port;

a primary manifold;

hydraulic fluid in said first central cavity of said housing, said second central cavity of said housing, said primary manifold, said first body port, said second body port, and said accumulator reservoir;

said primary manifold controls fluid flow within said dampener;

said primary manifold includes a first passageway and a second passageway;

said first body port in communication with said first passageway of said primary manifold and said first central cavity of said housing;

said second body port in communication with said second passageway of said primary manifold and said second central cavity of said housing;

said primary manifold includes a diverter valve in communication with said second passageway of said primary manifold and said accumulator reservoir;

hydraulic fluid flows bidirectionally between said second passageway of said primary manifold and said accumulator reservoir depending on the pressure in said second passageway in relation to the pressure in said accumulator reservoir;

a door open pressure relief valve in communication with said second manifold passageway for controlling the rotation of said vane and said shaft integral therewith in a first direction; and, a door closed pressure relief valve in communication with said first manifold passageway for controlling the rotation of said vane and said shaft integral therewith in a second direction.

13. A dampener, comprising:

a housing;

an accumulator reservoir, said accumulator reservoir holds hydraulic fluid;

a rotating shaft;

a vane integral with said rotating shaft and rotating therewith;

said housing includes a first central cavity and a second central cavity separated by said vane;

said housing includes a first body port and a second body port;

a primary manifold;

hydraulic fluid in said first central cavity of said housing, said second central cavity of said housing, said primary manifold, said first body port, said second body port, and said accumulator reservoir;

said primary manifold controls fluid flow within said dampener;

said primary manifold includes a first passageway and a second passageway;

said first body port in communication with said first passageway of said primary manifold and said first central cavity of said housing;

said second body port in communication with said second passageway of said primary manifold and said second central cavity of said housing;

said primary manifold includes a diverter valve in communication with said second passageway of said primary manifold and said accumulator reservoir;

hydraulic fluid flows bidirectionally between said second passageway of said primary manifold and said accumulator reservoir depending on the pressure in said second passageway in relation to the pressure in said accumulator reservoir; and, a needle valve intermediate said first body port and said second body port for adjustment of the position of said dampener arm.

14. A dampener installation method, comprising the steps of:

charging an accumulator with pressurized gas;

filling the dampener, primary manifold, accumulator manifold and conduits which interconnect the primary manifold and accumulator manifold with hydraulic oil;

adjusting an arm position valve enabling positioning and connection of a dampener arm and an integral vane relative to an excavator bucket connection; and, setting an opening pressure relief valve and a closing pressure relief valve.

15. A dampener installation method as claimed in claim 14, further comprising the steps of:

setting said opening pressure relief valve and said closing pressure relief valve as the first step.

* * * * *